UNITED STATES PATENT OFFICE.

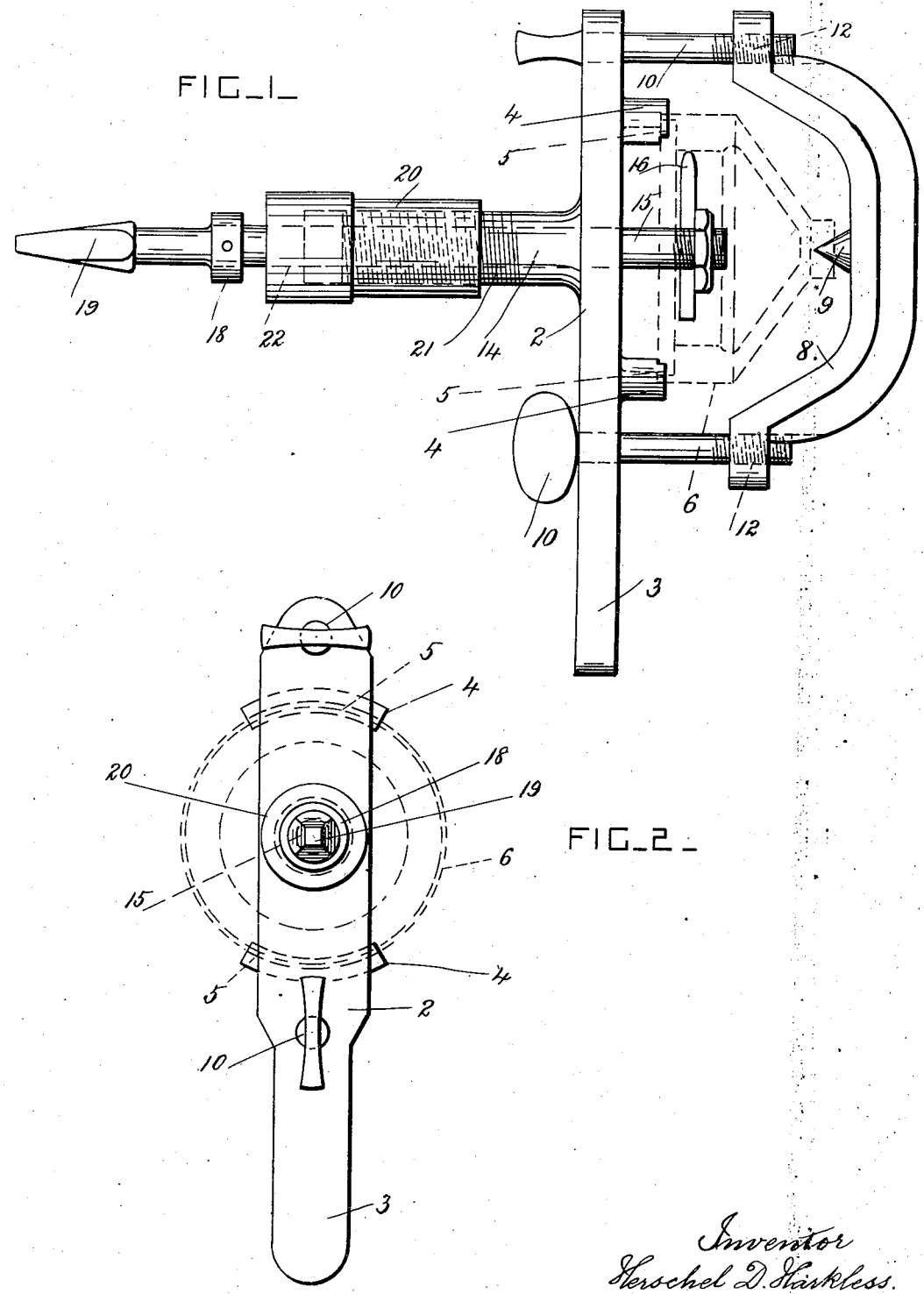

HERSCHEL D. HARKLESS, OF BREMEN, INDIANA.

BORING-MACHINE.

1,203,539.  Specification of Letters Patent.  Patented Oct. 31, 1916.

Application filed February 12, 1916. Serial No. 77,946.

*To all whom it may concern:*

Be it known that I, HERSCHEL D. HARKLESS, a citizen of the United States, residing at Bremen, in the county of Marshall and State of Indiana, have invented certain new and useful Improvements in Boring-Machines; and I do hereby declare the following to be a full, clear, and exact description of the invention, such as will enable others skilled in the art to which it appertains to make and use the same.

This invention relates to portable boring machines for boring the ignition timers used on internal combustion engines; and it consists in the novel construction and combination of the parts hereinafter fully described and claimed.

In the drawings, Figure 1 is a side view, partially in section, of a boring machine constructed according to this invention. Fig. 2 is an end view of the boring machine.

An upright 2 is provided having at one end a shank 3 adapted to be held in a vise or other approved support. The upright 2 has curved lugs 4 on one side, and these lugs have grooves or notches 5 on their inner edges for engaging with the periphery of a timer 6, which is indicated in dotted lines in the drawings. These timers have cylindrical portions, and internal rings of insulating material which require to be bored. An arch-shaped bar 8 is provided having a conical center 9 at its middle part which engages with a corresponding hole in the timer. Thumb-screws 10 are journaled in holes in the upright 2, and engage with screwthreaded holes 12 in the end portions of the bar 8. When these screws are tightened the timer is clamped in the grooves of the lugs 4 by the center 9. A bearing 14 is formed on the upright 2 in line with the center 9, and it has a screwthreaded portion 21 on its outer part. A boring spindle 15 is journaled in the bearing 14, and is also slidable in it longitudinally. The boring spindle has a suitable boring bit or cutter 16 adjustably connected to one end portion of it, and at its other end portion it has a stop collar 18 and a rectangular part 19. The rectangular part 19 is tapered and is made of any suitable form and proportions for engaging with any suitable means for revolving the boring spindle. A stop sleeve 20 is screwed on the screwthreaded portion 21, and is adjustable by hand. This sleeve has a bearing 22 at its outer end portion in which the boring spindle also revolves. The boring spindle is revolved and pressed longitudinally toward the timer so as to bore it out, and the sleeve 20 is arranged so that the collar 18 comes in contact with it when the timer has been bored to the requisite extent.

What I claim is:

1. In a boring machine, a supporting upright provided on one side with lugs having grooves for engaging with a timer, and having a bearing on the other side, a clamping bar provided with a center for engaging with the timer, clamping screws engaging with the said upright and bar, a boring spindle journaled in the said bearing and free to slide longitudinally in it, and means for regulating the longitudinal movement of the boring spindle toward the said center.

2. In a boring machine, a supporting upright provided on one side with lugs having grooves for engaging with a timer, and having a bearing on its other side provided externally with a screwthreaded portion, a clamping bar provided with a center for engaging with the timer, clamping screws for engaging with the said upright and bar, a boring spindle journaled in the said bearing and provided with a stop collar, said spindle being slidable longitudinally in the bearing, and a stop sleeve screwed on the said screwthreaded portion and provided with a bearing for the said spindle at its outer end portion.

In testimony whereof I have affixed my signature.

HERSCHEL D. HARKLESS.